United States Patent [19]

Schuring et al.

[11] Patent Number: 5,143,500
[45] Date of Patent: Sep. 1, 1992

[54] SNAP ENGAGING FASTENER SYSTEM FOR PROVIDING ROTARY MOTION

[75] Inventors: Eric J. Schuring, Caledon East; Vince Girimonte, Downsview, both of Canada

[73] Assignee: ITW Plastiglide, Concord, Canada

[21] Appl. No.: 661,970

[22] Filed: Feb. 28, 1991

[51] Int. Cl.⁵ .................. F16B 19/00; F16B 21/00
[52] U.S. Cl. .................. 411/339; 411/508; 411/913; 403/289; 16/38
[58] Field of Search .......... 411/338, 339, 508–510, 411/913, 48; 403/289, 290; 16/38, 39

[56] References Cited

U.S. PATENT DOCUMENTS

| | | | |
|---|---|---|---|
| 2,614,729 | 10/1952 | Jung | 411/339 |
| 3,115,804 | 12/1963 | Johnson | 411/339 |
| 3,611,861 | 10/1971 | Schulze | 411/913 |
| 4,012,155 | 3/1977 | Morris | 411/508 |
| 4,129,921 | 12/1978 | Greene | 411/508 |
| 4,952,107 | 8/1990 | Dupree | 411/508 |

Primary Examiner—Neill R. Wilson
Attorney, Agent, or Firm—Schwartz & Weinrieb

[57] ABSTRACT

Disclosed is a fastener system comprising a male or stud element with a split or bifurcated head, forming two prongs, that fits inside a female or socket sleeve. Inside the socket sleeve is an internal annular ring of a smaller diameter. The stud prongs deflect radially inwardly when pushed into contact with the internal ring until the prongs pass the ring at which point they deflect radially outwardly and lock the male member within the sleeve. This locking action allows for a variety of items to be clamped together along the length of the rivet sleeve provided that at each end of the rivet there is a head of larger diameter than that of the sleeve. Each head can be replaced by any number of integrally molded items requiring a locking/mating action or where locking and rotation is desired.

8 Claims, 2 Drawing Sheets

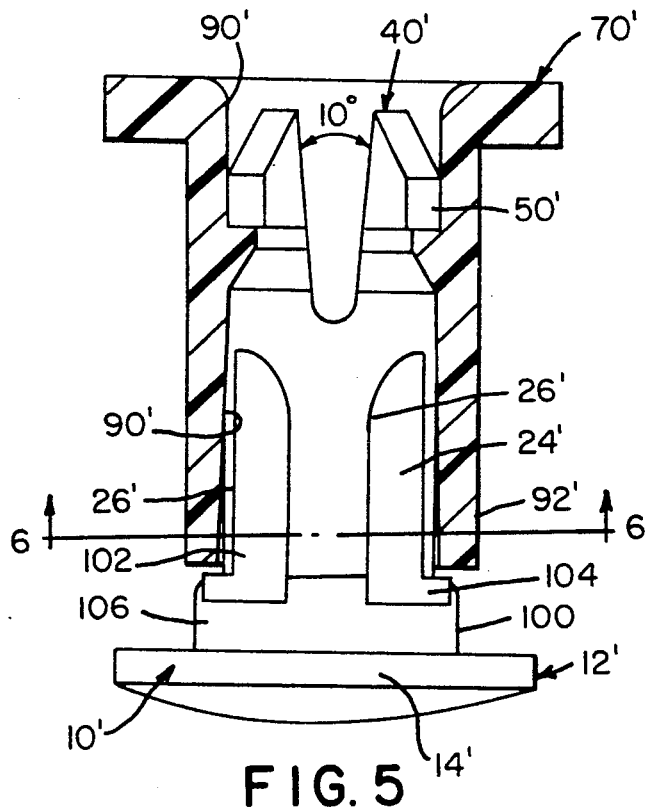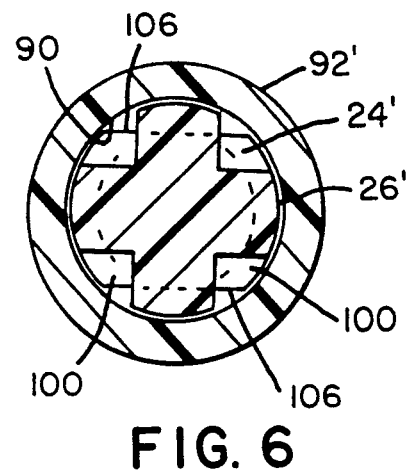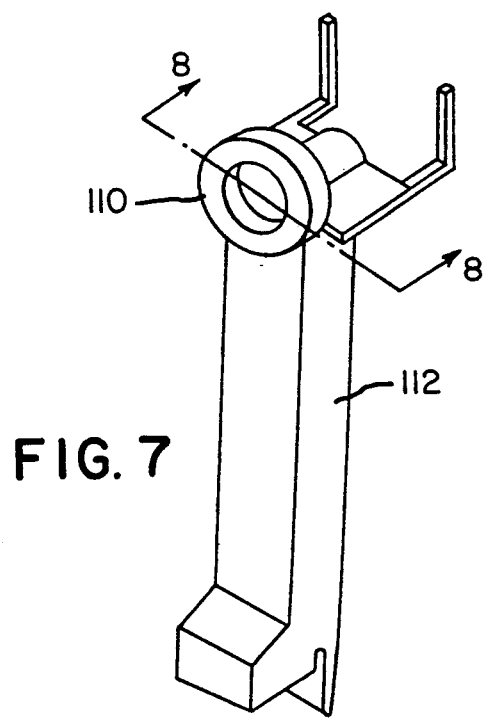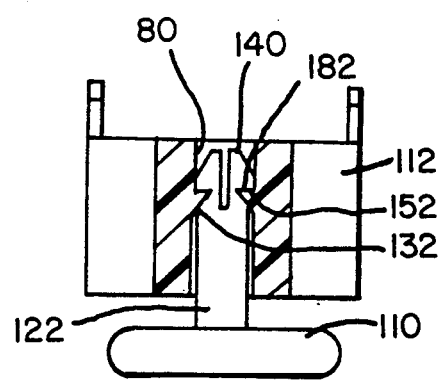

SNAP ENGAGING FASTENER SYSTEM FOR PROVIDING ROTARY MOTION

FIELD OF THE INVENTION

The present invention pertains to fastener systems and more particularly to a snap action fastener system defined between male and female parts. The parts can be used in the manner of a rivet, but are not limited thereto and the fastener system may be used to axially secure a roller device to a support member.

BACKGROUND OF THE INVENTION

Rivets and the like are well known fastener elements and often in the past they were constructed of metal. More recently, rivets have been made of plastic materials and Canadian patent 908,396 to Seckerson is typical of a rivet fastener system using a stud and socket concept (male and female parts). However, previous rivet-type fasteners often suffer from not being particularly strong in shear strength properties or characteristics and of exhibiting undesirable side-to-side movement.

Furthermore, two part fastener systems often depend upon the end of the socket contacting the head of the stud so as to limit the amount of insertion even though withdrawal of the stud is effectively prevented by means of the cooperating internal confronting shoulders.

Still further, in accordance with one prior art device, the stud shank has a solid shouldered end with the socket or female portion having a trifurcated annular collar. The furcations permit flexing of the collar in order to allow the shouldered end of the shank to pass through the collar opening and snap into place behind the collar.

Notwithstanding this prior art, there is still a need for a fastener device which is adapted to provide or serve as not only a rivet system but can also provide or serve as a fastener system wherein one of the stud and socket members is designed for some use other than as a rivet head such as for example a roller. The other one of the two parts may act as a support member, such as, for example, for a closet door or the like. In such case good shear strength is provided along with good rotational contact. Nevertheless little side-to-side movement and substantially no axial movement is allowed with this fastener system.

SUMMARY OF THE INVENTION

Briefly the present invention consists of a male or stud element with a split or bifurcated end, effectively forming two prongs, that fit inside a female or socket sleeve. Inside the socket sleeve is an internal annular ring which has a smaller diameter. The stud prongs deflect radially inwardly toward each other when pushed into contact with the internal ring until the prongs pass the ring at which point they deflect radially outwardly so as to lock the male or stud element within the female or socket sleeve. This locking action permits a variety or plurality of items to be clamped together along the length of the rivet sleeve provided that at each end of the fastener there is provided a head which has a larger diameter than that of the sleeve. Each head can be replaced by means of any number of integrally molded items requiring a locking/mating action or where locking and rotation is desired.

This fastener system can in many instances replace metal rivets, is non-corrosive, allows for rotational movement, and is strong in shear force or resistance characteristics. The length of the clamping area can also be varied so as to suit a particular application. There is minimal side-to-side movement of the stud inside the socket thus improving shear and torsional strength characteristics over those of the prior art. There is also no axial movement when the members are secured together. As a rivet, the fastening system finds application in securing shell, foam and inner material together in sports equipment, particularly hockey shin pads, shoulder pads and elbow pads. As a system wherein rotation is particularly desired, the device may be adapted to secure the shaft of a roller for a closet door track system.

Accordingly, the present invention pertains to a two part fastener system comprising a male member and a female member, the male member including a head and a shank having a free end, the shank comprising serially along its axis and extending in the direction toward the free end a first generally cylindrical portion, a first generally frustoconical portion, a second generally cylindrical portion of less diametric extent than that of the first cylindrical portion, a third generally cylindrical portion having a diametrical extent which is substantially the same as that of the first cylindrical portion and defining an annular shoulder with the second cylindrical portion, and a second generally frustoconical portion. A groove extends axially inwardly from the shank end so as to bifurcate at least the first and second frustoconical portions and the third and second cylindrical portions. The female member includes an axial bore having a series of internal surfaces including a frustoconical surface so as to bias the bifurcated shank end portions radially inwardly with respect to each other and a surface defining a shoulder for operative association with the shank shoulder. The axial and radial dimensions of the second cylindrical shank portion and the first frustoconical shank portion of the male member relative to the dimensions of the frustoconical and shoulder portions of the female bore are such that when the male and female members are axially assembled together, a snap action locking connection between the members is provided wherein the cooperating surfaces permit substantially only rotary movement of the members relative to each other.

A suitable plastic material for the fastener system is nylon. Nylon 6 or 66 are particularly preferred. However, in the embodiment including a roller member, the member may be of an acetal plastic material.

BRIEF DESCRIPTION OF THE DRAWINGS

Various other objects, features, and attendant advantages of the present invention will become more fully appreciated from the following detailed description when considered in connection with the accompanying drawings, in which like reference characters designate like or corresponding parts throughout the several views, and wherein:

FIG. 5 is a longitudinal sectional view similar to that of FIG. 1 showing, however, a modification of the rivet of FIG. 1.

FIG. 6 is a sectional view taken along the lines 6—6 of FIG. 5.

FIG. 7 is a perspective view of a device to which the fastening system of the present invention is adapted.

FIG. 8 is a sectional view taken along the lines 8—8 of FIG. 7.

DESCRIPTION OF THE PREFERRED EMBODIMENTS

Figure 1:
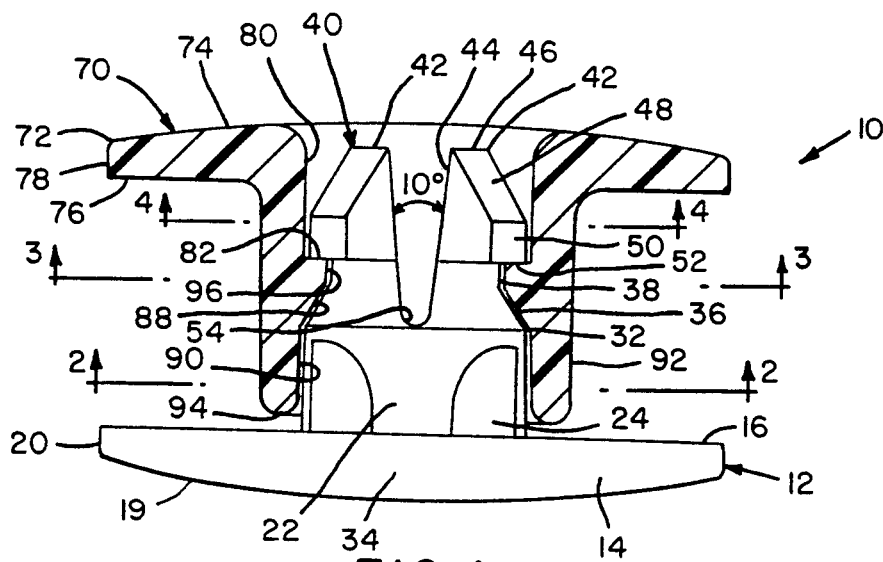
FIG. 1 is a longitudinal sectional view of the two part fastening system constructed in accordance with the present invention and embodied as a rivet.

FIGS. 1-4 show, in cross-section, one embodiment of the fastener system constructed in accordance with the present invention. In particular, rivet 10 includes stud or male part 12 having circular flanged head 14 having a flat inner surface 16 and slightly convex outer surface 18 merging into peripheral edge 20.

Figure 2:
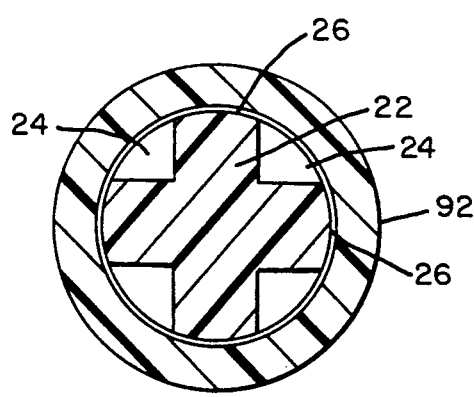

Shank 22 has a cruciform cross-sectional configuration at an axial position adjacent flanged head 12 (FIG. 2) as formed by means of recesses 24. As seen in FIG. 2, the cruciform configuration includes outer peripheral arcuate shank portions 26. As can be appreciated from FIG. 1, shank 22 and in particular portions 26 are slightly tapered in the axial direction extending from the head inner surface 16 to transition line 32, the taper being preferably approximately 3° with respect to shank axis 34. The recesses 24 terminate below transition line 32 where the shank cross-section is generally circular. Shank 26 then slopes inwardly at approximately 30° with respect to shank axis 34 so as to define conical surface 36 and again extends axially so as to define cylindrical surface 38.

Bifurcated prong or end 40 comprises two identically molded parts 42 divided by means of groove 44 wherein each part 42 has a flat end 46, a chamfered or sloped side 48 and a cylindrical section 50, sloped side 48 being at approximately 30° with respect to shank axis 34. Each part 42 of end 40 has a shoulder 52 which meets cylindrical shank portion 38 at the radially inward portion thereof.

Figure 4:
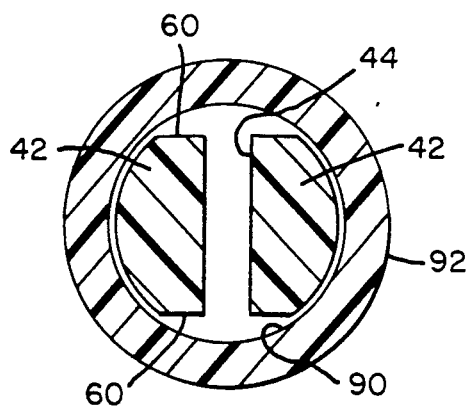
FIGS. 2, 3 and 4 are sectional views taken along lines 2—2, 3—3 and 4—4 of FIG. 1.
Figure 3:
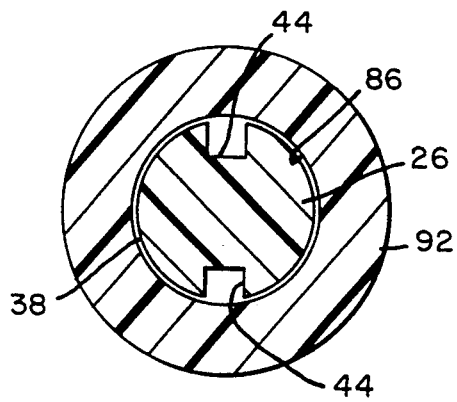

It will be seen from FIG. 4 that end parts 42 are flattened at 60 upon each side thereof. Groove 44 extends axially into the shank 22 past shoulders 52 and terminates at curved point 54 just above transition line 32. Groove 44 defines an included angle of 10° between the opposite shank parts 42, that is, each shank part is disposed at an angle of 5° with respect to axis 34.

Female or socket part 70 of rivet 10 comprises outer flange end 72 with outer surface 74, slightly tapering toward inner flat surface 76, and peripheral edge 78.

Female part 70 has a first inner cylindrical bore 80 terminating at an annular shoulder 82. A second inner cylindrical bore 86 and conical or tapered portions 88 and 90 are generally complementary to the portions 38, 36 and 26 of shank 22. Female part 70 has an outer cylindrical surface 92 with an arcuately curved end 94 meeting slightly tapered bore wall section 90.

The connection of male part 10 and female part 70 will be evident from the above description and FIGS. 1-4. As male prong 40 is inserted into female bore 90, there is no flexing of parts 42 of the male member since the diameter of cylindrical portion 50 of ends 42 is approximately equal to that of female bore 90. Once inserted, sloped surfaces 48 of ends 42 will contact sloped surface 36 of the female member and be flexed radially inwardly through bore 86 until cylindrical portions 50 of ends 42 pass through bore 86 whereupon male part shoulders 52 will snap into confronting association with female part shoulders 82.

The complementarily tapered surfaces 36 and 88 of the male and female portions respectively limit inward movement of the male member 10 relative to the female member. Female end 94 is spaced from male inner surface 16. Furthermore, the recesses 24 reduce the weight of the rivet and also serve to reduce the rotational friction as may be important in connection with the various uses of the snap action device of the present invention.

FIGS. 5 and 6 show a variation of the fastener system of the present invention when used as a rivet wherein like numbers with a prime (') correspond to like parts or features in FIGS. 1-4. However, it will be noted that the shank is longer and the male part 12' includes a portion 100 adjacent head 14', and there are additional recess portions 104 associated with recesses 24' extending into portion 100. Sides 106 of portions 100 are flat. Although bore 90' is slightly tapered, shank portions 26' are not in this embodiment.

FIGS. 7 and 8 show the use of the fastener system of the present invention for securing a roller 110 to a closet door hanger 112, the specific details of such hanger other than those of the fastening system of the present invention being deemed not significant to the invention described herein, and therefore, such auxiliary details have been omitted herefrom. As will be apparent from FIG. 8, the roller 110 includes shank 122 with a bifurcated prong on end 140 which shank and prong are constructed in accordance with the details of FIGS. 1-6. However, the shank 122 is solid without recesses. It will be noted that the tapered configuration of the shank and bore within the vicinity of the transition area 132, along with the cooperation of the shoulders 152 and 182 provide a tight, snap action connection. The connection allows for the necessary rotation of roller 110 as well as providing a secure locking action. The connection is strong in shear and is therefore capable of providing a strong yet economical roller mechanism.

Although we have provided a simple but effective fastener system capable of being used not only in the riveting art wherein not only is a strong locking mating action required but also a strong locking rotational action may be required or desired, the system described comprises preferred embodiments and obvious modifications will be apparent to those skilled in the art and we claim such modifications that fall within the claims of this application.

The embodiments of the invention in which an exclusive property or privilege is claimed are defined as follows:

1. A two part fastener system, comprising:
   a male member; and
   a female member;
   said male member including a shank having an end and having serially along its axis toward said end a first generally cylindrical portion; a first generally frustoconical portion; a second generally cylindrical portion of less diametrical extent than that of said first cylindrical portion; a third generally cylindrical portion having a diameter which is substantially equal to that of said first cylindrical portion and defining a radial shoulder, extending substantially perpendicular with respect to said axis of said shank, along with said second cylindrical portion; and a second generally frustoconical portion; a groove also extending axially inwardly from said shank end so as to bifurcate at least said first and second frustoconical portions and said third and second cylindrical portions;

said female member including a bore having a series of internal surfaces including a frustoconical surface for biasing said bifurcated shank end radially inwardly, and a surface defining a radial shoulder, extending substantially perpendicular with respect to a longitudinal axis of said bore of said female member, for operative cooperation with said shank shoulder, the axial and radial dimensions of said second cylindrical shank portion and said first frustoconical shank portion of said male member relative to the dimensions of said frustoconical and shoulder surfaces of said female bore being such that when said male and female members axially assembled together, a locking snap action connection between said male and female members is achieved wherein said operative cooperating radial, axial, and frustoconical surfaces permit only rotary movement of said male and female members relative to each other while substantial axial movement of said male and female members with respect to each other is effectively prevented.

2. The invention of claim 1 wherein the shank first cylindrical portion has a cruciform cross-sectional configuration for a substantial portion of its axial extent.

3. The invention of claim 1 wherein said first generally cylindrical portion is tapered inwardly slightly and said female member has a complementary shaped bore surface.

4. The invention of claim 1 wherein the two part fastening system is a rivet, each member having an integral head element.

5. The invention of claim 1 wherein the two part fastening system is associated with securing roller means to a support means, the male member including a roller integral with the other end of the shank, and the female member being integrally part of said support means.

6. The invention of claim 1 wherein the groove is tapered inwardly with an included angle of 10°.

7. The invention of claim 1 wherein the slope of the two frustoconical shank portions is the same.

8. A fastener system as set forth in claim 7, wherein: said slope of said two frustoconical portions of said shank is approximately 30°.

* * * * *